United States Patent [19]

Heeger et al.

[11] Patent Number: 4,980,762

[45] Date of Patent: Dec. 25, 1990

[54] METHOD AND APPARATUS FOR IMAGE PROCESSING TO OBTAIN THREE DIMENSIONAL MOTION AND DEPTH

[75] Inventors: David J. Heeger, Cambridge, Mass.; Allan Jepson, Toronto, Canada

[73] Assignee: Massachusetts Institute of Technology, Cambridge, Mass.

[21] Appl. No.: 421,141

[22] Filed: Oct. 13, 1989

[51] Int. Cl.$^5$ .............................................. H04N 7/18
[52] U.S. Cl. ...................................... 358/93; 352/44; 352/53; 358/105
[58] Field of Search ........................ 358/93, 105, 125; 352/44, 53; 901/47

[56] References Cited

U.S. PATENT DOCUMENTS

| | | | |
|---|---|---|---|
| 4,556,986 | 12/1985 | Craig | 358/125 |
| 4,760,445 | 7/1988 | Mijiyawa | 358/105 |
| 4,851,905 | 7/1989 | Pryor | 358/125 |

OTHER PUBLICATIONS

J. Barron, A Survey of Approaches for Determining Optic Flow, Environmental Layout and Egomotion, Technical Report RBCV-TR-84-5, Department of Computer Science, University of Toronto, 1984.
J. K. Aggarwal and N. Nandhakumar, on the Computation of Motion from Sequences of Images—a review. *Proceedings of the IEEE*, 76:917–935, 1988.
S. Ullman, Maximizing Rigidity: the Incremental Recovery of 3-D Structure from Rigid and Rubbery Motion. *Perception*, 13:255–274, 1984.
J. W. Roach and J. K. Aggarwal, Determining the Movement of Objects from a Sequence of Images, *IEEE Pattern Analysis and Machine Intelligence*, 2:554–562, 1980.
P. Anandan, a Computational Framework and an Algorithm for the Measurement of Visual Motion, *International Journal of Computer Vision*, 2:283–310, 1989.
B. K. P. Horn and B. G. Schunk, Determining Optical Flow, *Artificial Intelligence*, 17:185–203, 1981.
D. J. Heeger, Optical Flow Using Spatiotemporal Filters, *International Journal of Computer Vision*, 1(14):279–302, 1988.
A. R. Bruss and B. K. P. Horn, Passive Navigation, *Computer Vision, Graphics, Image Processing*, 21:3–20, 1983.
B. K. P. H. Horn and E. J. Weldon, Direct Methods for Recovering Motion, *International Journal of Computer Vision*, 2:51–76, 1988.
J. J. Koenderink and A. J. van Dorn, Local Structure of Movement Parallax of the Plane, *Journal of the Optical Society of America*, 66:717–723, 1975.
H. C. Longuet-Higgins and K. Prazdny, the Interpretation of a Moving Retinal Image, *Proc. Roy. Soc. Lond. B*, 208:385–397, 1980.
A. M. Waxman, B. Damgar-Parsi, and M. Subbarao, Closed-from Solutions to Image Flow Equations and 3-D Structure and Motion, *International Journal of Computer Vision*, 1:239–258, 1987.

(List continued on next page.)

*Primary Examiner*—Howard W. Britton

[57] ABSTRACT

An image processing system provides the capability of extracting three dimensional motion information from two dimensional images. The image processing system achieves such extraction by analyzing selected image points. The selected image points correspond to the projection of points on a three dimensional object. The object is moving over time (i.e. translating and rotating with respect to the imaging device). The selected image points are processed in parallel by a plurality of processors to first determine the translational velocity. Next, the rotational velocity of the patch is determined. Lastly, the relative depth of each image point is determined in light of the previously determined translational and rotational velocity. The image processing system accomplishes this task by using an imager and a processing means. The system has potential applications in filming and in robotics.

39 Claims, 6 Drawing Sheets

OTHER PUBLICATIONS

R. Jain, Direct Computation of the Focus of Expansion, *IEEE Pattern Analysis and Machine Intelligence*, 5:58–63, 1983.

H. C. Longuet-Higgins, a Computer Algorithm for Reconstructing a Scene from Two Projections, *Nature*, 293:133–135, 1981.

J. Weng, T. S. Huang, and N. Ahuja, Motion and Structure from Two Perspective Views: Algorithms, Error Analysis, and Error Estimation, *IEEE Pattern Analysis and Machine Intelligence*, 11:451–476, 1989.

K. Prazdny, Egomotion and Relative Depth from Optical Flow, *Biological Cybernetics*, 102:87–102, 1980.

J. H. Reiger and D. T. Lawton, Processing Differential Image Motion, *Journal of the Optical Society of America, A*, 2:354–359, 1985.

K. Prazdny, on the Information in Optical Flows, *Computer Vision, Graphics Image Processing*, 22:239–259, 1983.

METHOD AND APPARATUS FOR IMAGE PROCESSING TO OBTAIN THREE DIMENSIONAL MOTION AND DEPTH

BACKGROUND OF THE INVENTION

Objects in three dimensional space are viewed by humans as the image they project onto a two dimensional imaging surface. It is such projected two dimensional images that are processed to extract relevant three dimensional motion information. This processing of the two dimensional image data to extract three dimensional motion information is generally performed in two stages. In the first stage, the two dimensional image motion is extracted from sequences of images. Image motion is typically respresented as a field of two dimensional velocity vectors, one for each small region of the visual field. These two dimensional velocity vectors are known as optical flow vectors. Sets of these vectors form optical flow fields. In the second stage, the extracted image motion is interpreted in terms of objects and surfaces in the three dimensional world.

Analysts have been quite successful in performing the first stage. In particular, they have been successful in extracting optical flow fields for machine vision application. Unfortunately, analysts have not met with equal success regarding the second interpretive stage. Efforts to date have only been able to determine minimal three dimensional information and have only revealed data for greatly specialized circumstances.

SUMMARY OF THE INVENTION

In accordance with the present invention, an image processing system provides the capability of determining a direction of three dimensional translational velocity of an object from a sequence of two dimensional images taken over time. Such images maybe taken in consecutive time frames and are typically projections of objects. To determine the direction of three dimensional translational velocity a plurality of image points are selected from the sequence of images. It is preferred that the image points correspond to projections of object points that share the same direction of three dimensional translational velocity. The image points are preferably selected for corresponding object points at different depths so as to remove ambiguity that might otherwise arise in determining the three dimensional motion of the object. It is also preferable that the image points be selected so as to assure that the columns of a coefficient matrix ($C(\vec{T})$) spans a subspace as will be described below. Selecting the image points in a configuration akin to the "5" side of a dice assures that the columns will span this subspace.

A transformation is performed upon the image intensities for the selected plurality of image points to yield transformation vectors. It is preferred that the transformation performed extracts image velocity vectors for the selected points. This approach, however, need not be followed for it is not necessary that extraction of the image velocity vectors be a distinct step; rather, it may be integrated with subsequent steps. The transformation vectors are designated as $\vec{\theta}$.

Once the transformation vectors have been found, the image processing system finds a direction of translational velocity T such that the transformation vectors are in the range of the coefficient matrix C(T). The coefficient matrix is a set of columns vectors that span a space of all possible $\theta$ for rigid objects with translational velocity in the direction of T and any arbitrary rotational velocity. This space is the subspace referred to above in the discussion of selection of the image points. There are many approaches to the steps of finding $\vec{T}$. Two of the more prevalent approaches are to either first, use a trial and error technique for points in the solution space or second to employ a systematic search strategy so as to try only certain possible solutions.

The object from which the image points project may be a three dimensional object. The positions of the selected image points and the $\vec{T}$ determine the coefficient matrix $C(\vec{T})$. The coefficient matrix plays a crucial role in the process of extracting the three dimensional translational velocity. In particular, the step of finding a direction of translational velocity may further comprise finding a $\vec{T}$ so that an orthogonal complement of the coefficient matrix is orthogonal to the transformation vectors $\theta$. The orthogonal complement is preferably orthonormal and preferably is comprised of basis vectors that span the sub-space of all vectors orthogonal to the coefficient matrix $C(\vec{T})$.

One means of showing that the orthogonal complement and $\vec{\theta}$ are orthogonal is to calculate the dot product of them. If the dot product is zero, they are indeed orthogonal; hence, the step of finding $\vec{T}$ may be performed by determining whether the dot product is zero. An optimization on such an approach is to precompute all possible values of the orthogonal complement for a range of discrete $\vec{T}$ values. This precomputation reduces the task of computing the corresponding residual value for a chosen $\vec{T}$ to a dot product.

Once the translational velocity in two dimensions is known, it is a straightforward process to determine other motion parameters and three dimensional depth. In particular, the present invention includes an embodiment where the translational velocity direction in three dimensions is determined and then the rotational velocity of the same object in three dimensions is determined. Lastly, the relative depth of the object in three dimensions is discerned.

The above described process is performed by an image processing system having an imager for receiving two dimensional projections of three dimensional objects. It also includes a processing means. The processing means processes a series of images of objects to determine the three dimensional motion and depth. The imager is preferably an array of imaging elements, such as charge coupled devices, and an ideal candidate for the imager is a video camera. So as to operate efficiently, a processing means should be comprised of a plurality of processing elements that act in parallel. One possible approach is for each processing element to act on a selected region of each image.

One application in which the image processing system may be used is that of motion picture filming. In particular, film may be generated in a first setting. This film may be subsequently processed so that the three dimensional motion is extracted from the two dimensional images of the film. By knowing the three dimensional motion information, one can apply the motion in a second setting. Specifically, one can repeat the three dimensional motion and film in the second setting so that the films from the first setting and the second setting correspond and can be superimposed. Another option is for the second setting to be a computer graphics simulated scene.

An additional application is to employ the image processing system in a robot. When employed as such, the robot has an imager that views a three dimensional space located in the proximity of the robot. The images generated by the imager are processed so that the three dimensional motion experienced by the robot can be discerned. The robot can therefore, track its motion in the surrounding three dimensional space and appropriately adjust its motion.

The present invention includes an intelligent camera that records two dimensional images of objects in three dimensions. The camera processes the two dimensional image data to determine the corresponding translational velocity and rotational velocity of the objects. It is also useful in determining the relative depth maps of the objects. Such three dimensional information may be determined for each object that is imaged.

DETAILED DESCRIPTION OF THE PREFERRED EMBODIMENT

In accordance with the preferred embodiment of the present invention, an image processing system processes two dimensional image data that depicts motion of objects in three dimensions. The two dimensional image data is gathered using an imager such as a video camera or charge coupled device array. The objects that are viewed may be material objects or non-material objects. The primary requirement is that the objects appear in the image.

Figure 1:
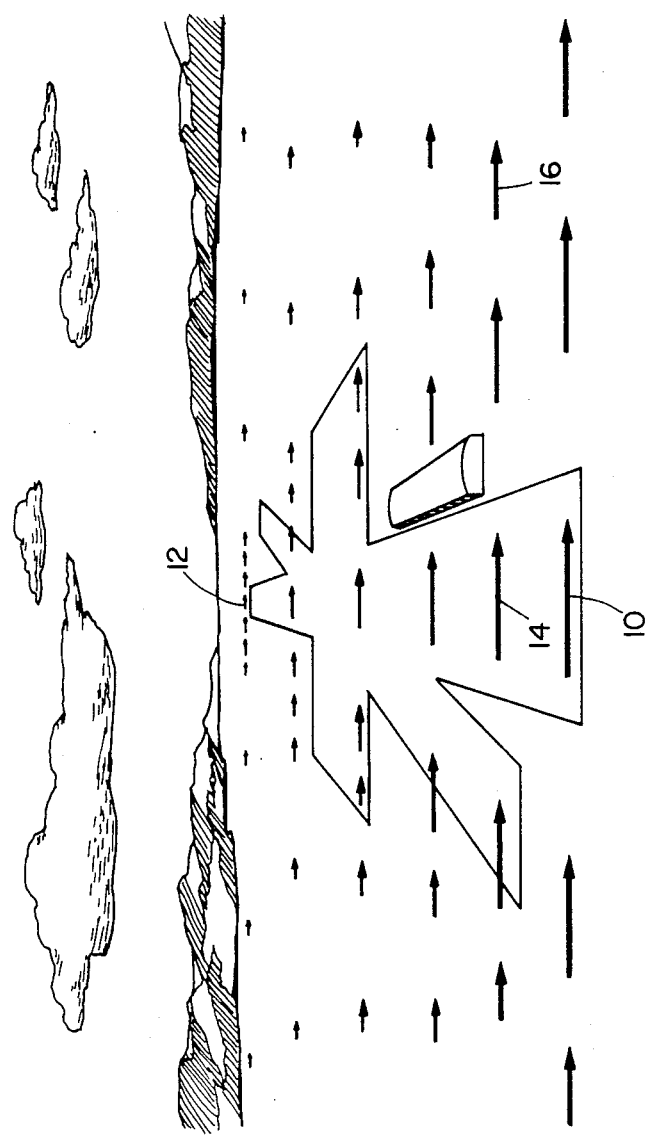
FIG. 1 depicts a two dimensional image of a three dimensional scene with corresponding optical flow vectors superimposed.

FIG. 1 shows a typical two dimensional image of a three dimensional scene. The arrows represent selected optical flow vectors for the image. The image shown in FIG. 1 is for a scene having stationary rigid objects and a viewer moving across the page in the direction indicated by the arrow in the bottom left-hand corner of the page. The optical flow vectors at different points in the image are indicated by the arrows such as 10, 12, 14 and 16. Note that the magnitude of the image flow vectors (indicated by the size of the arrows) decreases as the corresponding image points are located further from the imaging surface. In other words, the magnitude of image velocity decreases with increasing image depth relative to the viewer. Thus, arrow 10 is longer than arrows 12 and arrow 14 is longer than arrow 16.

The system processes the two dimensional images, to obtain optical flow fields for the images which are used to accurately determine the corresponding three dimensional motion of the objects. Specifically, given a sequence of images of rigid body motion of an object, the image processing system of the preferred embodiment can extract the direction of translational velocity of the object, and it can also extract the rotational velocity of the object from the image sequence. Once the system has determined the translational velocity direction and the rotational velocity, it determines the relative depth of points on the object. It does this in one approach by dividing the image of a scene into a plurality of patches that are image regions for portions of the three dimensional scene that experience identical three dimensional rigid body motion relative to a viewer. Subsequently, in this embodiment the system determines the motion for each of the patches to determine the three dimensional motion for the entire scene that is imaged. As will be discussed later, in an alternate embodiment all of the patches are processed together to derive the three dimensional motion and depth.

Figure 2:
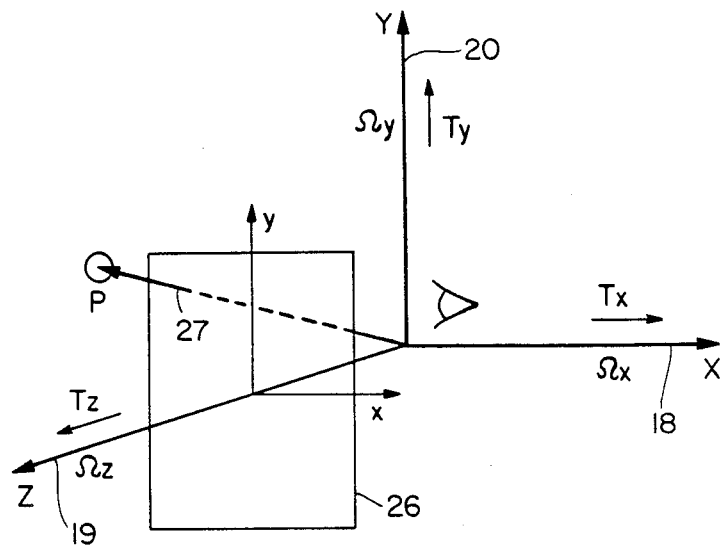
FIG. 2 illustrates the projection of a point in three dimensions to a two dimensional imaging plane.

In order to adequately understand how the present invention extracts such three dimensional motion and depth information, it is necessary to first understand the model of motion upon which it relies. In general, a two dimensional image of a three dimensional scene can be viewed as a projection of an image of the object from three dimensions to a two dimensional imaging plane 26. FIG. 2 depicts an example of such a projection for a single three dimensional point (X,Y,Z).

For every point of a three dimensional scene that is imaged there is a corresponding position vector, $\vec{R}=(X,Y,Z)^t$, where t indicates transpose, relative to a viewer-centered coordinate frame. The position vector is comprised of components in the X, Y and Z directions (18, 20 and 19 respectively). The point projects to the two dimensional xy image plane 26 at a point (x,y) 27 where $$x = fX/Z$$
$$y = fY/Z \qquad \text{(equation 1.0)}$$

and where f is the focal length.

The three dimensional motion of an object is characterized by its linear and rotational velocities. The linear and rotational motion change when the object is subject to angular or linear accelerations. The three dimensional motion may be characterized as motion of the object relative to a stationary viewer or in the alternate, as motion of the viewer with respect to a stationary object. In the preferred embodiment, the motion is taken as that of the viewer relative to an object that is stationary. Given this perspective, the translational velocity of the relative three dimensional motion is $$\vec{T} = (T_x, T_y, T_z)^t \qquad \text{(equation 2.0}a\text{)}$$

where $T_x$, $T_y$ and $T_z$ are the X, Y and Z components, respectively, of the three dimensional translational velocity for a given object and t indicates a transpose. Further, the rotational velocity $$\vec{\Omega} = (\Omega_x, \Omega_y, \Omega_z)^t \qquad \text{(equation 2.0}b\text{)}$$

where $\Omega_x$, $\Omega_y$ and $\Omega_z$ are the X, Y and Z components, respectively, of the rotational velocity for the given object point. It should be noted that these equations are for rigid body motion, and thus, all points on the rigid body experience the same three dimensional motion.

Given the above descriptions of the three dimensional motion of the object, an equation may be derived that expresses the three dimensional motion for each object point in terms of the translational and rotational velocity components. In particular, taking the derivative of position vector R yields the instantaneous velocity of that point which may also be expressed in terms of the translational and rotational velocity of the object. Specifically, the resulting equation is:

$$V = \left(\frac{dX}{dt}, \frac{dY}{dt}, \frac{dZ}{dt}\right)^t = -(\Omega \times R + T) \quad \text{(equation 3.0)}$$

In other words, if the derivative with respect to time is taken of the three dimensional position of object points, the relative motion of the object can be expressed in terms of the negative sum of translational velocity vector with the cross product of the rotational velocity vector and the position vector.

The above equation speaks only in terms of three dimensional velocity. Standing alone, such an equation is of little utility because all that is provided as input to the system is two dimensional image data. Nevertheless, motion of an object in the three dimensional scene is revealed in the corresponding motion in the two dimensional image. The two dimensional image motion is a projection of the three dimensional motion, the two dimensional image motion data must be processed appropriately to recover the true three dimensional motion. It is the change experienced at selected image points attributable to the relative motion of the three dimensional objects that are used to calculate the optical flow fields that quantize image velocity.

The two dimensional image velocity may be denoted as:

$$\vec{\theta}(x,y) = \left(\frac{dx}{dt}, \frac{dy}{dt}\right) \quad \text{(equation 4.0)}$$

for point (x,y) on the two dimensional imaging plane. It is comprised of the derivatives of the x and y components of projection of an object point with respect to time.

Since, the motion in the image corresponds to motion of the three dimensional scene points (see equation 1.0), the image velocity vectors can be expressed in terms of the three dimensional motion parameters discussed above. In particular, by using the relationship expressed in equation 1.0 along with equation 3.0, the image velocity vector at an image point (x,y) can be expressed as $$\vec{\theta}(x,y) = p(x,y)A(x,y)\vec{T} + B(x,y)\vec{\Omega} \quad \text{(equation 5.0)}$$

where p(x,y) = 1/Z is inverse depth, and where:

$$A(x,y) = \begin{bmatrix} -f & 0 & x \\ 0 & -f & y \end{bmatrix}$$

-continued $$B(x,y) = \begin{bmatrix} (xy)/f & -(f + x^2/f) & y \\ f + y^2/f & -(xy)/f & -x \end{bmatrix}$$

This equation is known in the prior art but has been of little practical utility because it has been very difficult to process the image data in accordance with this equation so as to obtain the translational velocity or the rotational velocity of an object from image motion data, measurements or vectors. The major obstacle is that the relationship between the image velocity vector, the three dimensional motion parameters and depth is a non-linear relationship. As a result, it presents a very complicated equation to solve. The present invention is, however, able to simplify the task. In particular, the present invention processes the image data to first solve for the direction of the translational velocity and then to solve for the rotational velocity and depth.

As shown in equation 5.0, the depth and the translational velocity are unknowns. Given that they are multiplied together in that equation, they can be determined only up to a scale factor. Specifically, in the preferred embodiment only the direction of translation is determined. The magnitude of the three dimensional translational velocity is not determined. Similarly, only the relative depth, relative to the translational velocity, is determined; the absolute depth is not determined. The $\vec{T}$ value discussed hereinafter refers to a unit vector in the direction of the three dimensional translational velocity of an object, and p(x,y) refers to the relative depth for points on the object.

The starting point for determining the direction of three dimensional translational velocity from the two dimensional image data is the previously described equation 5.0. The image processing system needs to solve for the vector $\vec{T}$ for each of the objects in a scene. To solve for $\vec{T}$, the image processing system divides each image into patches. The patches, as previously mentioned, represent regions of the image which correspond to portions of the scene that experience the same three dimensional motion. For rigid body objects, all of the points in the image representing projections from the object are combined into a single patch. Within each patch the image processing system selects a plurality of sets of five image points. These sets are selected so that there are enough sets to cover the entire patch. The image points are selected so that they are projections of object points that share the same three dimensional motion. Specifically, the image points are selected so that they experience the same three dimensional translational velocity. In accordance with one embodiment, the image points are selected in a pattern resembling the "5" side of a dice. As will be discussed later, the image points are selected in this manner so that it is certain that the columns of a coefficient matrix (described below) are linearly independent. This matrix is dependent on the pattern of image points chosen. Almost any pattern that selects image points that are projections of object points having identical three dimensional motion will suffice.

The image processing system calculates image velocity data $\vec{\theta}(x,y)$ for each of the five points for each of the sets of points in the patches. This determination can be made as disclosed by Heeger, D. J., "Model for Extraction of Image Flow," *Journal of the Optical Society of America*, (4(8): 1455-1471, 1987. Referring back to equation 5.0, it can be seen that once the position (x,y) of an image point and the image velocity $\vec{\theta}$ for (x,y) are known for each point, the left hand side of the equation as well as A(x,y) and B(x,y) are known for the chosen image point. The remainder of the discussion will focus on analysis of T for a selected set of five image points. It should be born in mind that this process is repeated for each set of five selected points in a patch and in turn, for all patches.

$\vec{\theta}$ is a two dimensional vector comprised of an x component and a y component. If the corresponding image velocities for each of the five selected points are rewritten in terms of their x component and y component, $\vec{\theta}$ is represented as a 10 vector:

$$\vec{\theta} = \begin{bmatrix} \theta_x(x_1,y_1) \\ \theta_y(x_1,y_1) \\ \vdots \\ \theta_x(x_5,y_5) \\ \theta_y(x_5,y_5) \end{bmatrix}$$ (equation 6.0)

Other variables in equation 5.0 may also be written in matrix form. For instance, the A(x,y) matrices for each corresponding x component and y component of the image points may be collected together along with unknown translational velocity $\vec{T}$ to form a single matrix denoted as $A(\vec{T})$ such that $$A(\vec{T}) = \begin{bmatrix} A(x_1,y_1)\vec{T} & & \\ & \ddots & \\ & & A(x_5,y_5)\vec{T} \end{bmatrix}$$ (equation 7.0)

Furthermore, the matrix B may be formed by collecting together into a single matrix the five $$B = \begin{bmatrix} B(x_1,y_1) \\ \vdots \\ B(x_5,y_5) \end{bmatrix}$$ (equation 8.0)

Lastly, the depth at each image point may be collected into a five vector denoted as p where $$p = \begin{bmatrix} p(x_1,y_1) \\ \vdots \\ p(x_5,y_5) \end{bmatrix}$$ (equation 9.0)

These aggregates may be combined in a single equation for the five image points:

$$\vec{\theta} = A(\vec{T})\vec{p} + B\vec{\Omega}$$ (equation 10.0)

This equation may be further simplified as $$\vec{\theta} = C(\vec{T})\vec{q}$$ (equation 11.0)

where: $C(\vec{T}) = [A(T)\ B]$ and $\vec{q} =$ $$q = \begin{bmatrix} P(x_1,y_1) \\ \vdots \\ P(x_5,y_5) \\ \vec{\Omega}_1 \\ \vdots \\ \vec{\Omega}_5 \end{bmatrix}$$

When expressed in this manner, $\vec{\theta}$ is the product of a 10×8 matrix and a ten vector.

Tenets of linear algebra dictate that this equation reveals that $\vec{\theta}$ lies in a subspace spanned by the column vectors of $C(\vec{T})$ for the correct value of $\vec{T}$. Every vector in the subspace can be expressed as a combination of the column vectors. $\vec{\theta}$ is a weighted sum (combination) of those column vectors. The vector denoted as q merely acts as the weighting factor for the combination. The fact that $\vec{\theta}$ lies in in a subspace spanned by $C(\vec{T})$ is used to determine what the value of $\vec{T}$ is for the three dimensional motion. For an arbitrary choice of $\vec{T}$, $\vec{\theta}$ will not lie in the subspace spanned by $C(\vec{T})$. Only for the correct value of $\vec{T}$ does C lie in the subspace spanned by $C(\vec{T})$.

Given any value of $\vec{T}$, the system can easily determine $C(\vec{T})$. Once $C(\vec{T})$ is known, an orthogonal, and preferably orthonormal, compliment denoted as $\check{C}(\vec{T})$ is found. The orthogonal complement $\check{C}(\vec{T})$ is comprised of basis vectors orthogonal to $C(\vec{T})$. The basis is a set of vectors that are linearly independent and that span the orthogonal subspace. Furthermore, the basis vectors are orthogonal to the subspace spanned by the columns of $C(\vec{T})$. Techniques for finding such an orthogonal basis are widely known in the prior art. For example, it should be noted that any set of vectors that span the orthogonal subspace may work equally well. The vectors need not be linearly independent or orthonormal. Such alternative choices of vectors are intended to be encompassed within the present invention.

$C(\vec{T})$ is comprised of eight vectors, each having ten components. The orthonormal compliment, thus, spans two dimensions and is represented by a 10×2 matrix. By definition $\check{C}(\vec{T})$ is orthogonal to $C(\vec{T})$. For the correct value of T $\theta$ resides in the subspace spanned by the column vectors of $\check{C}(\vec{T})$ so that it is certain that $\check{C}(\vec{T})$ is orthogonal to $\theta$. It is this characteristic orthogonality that is exploited by the present invention to find an appropriate solution for $\vec{T}$, because only the correct value of $\vec{T}$ produces a $\check{C}(\vec{T})$ that is orthogonal to $\theta$.

A residual is found at $\vec{T}$. Specifically, the residual $R(\vec{T})$ is defined as:

$$R(\vec{T}) = \| \theta \cdot \check{C}(\vec{T}) \|^2$$ (equation 12.0)

At the appropriate value of $\vec{T}$, $R(\vec{T}) = 0$ because the dot product of two orthogonal vectors is 0. Thus, the key is to locate a $\vec{T}$ such that $R(\vec{T})$ equals 0. This can be accomplished on a trial and error basis choosing random $\vec{T}$ values until a proper value is found. Alternately, the task can be performed by certain search techniques that do not examine all possible values in the solution space.

The preferred approach is to calculate $\check{C}(\vec{T})$ for a sampling of all possible values of $\vec{T}$ and then to locate the appropriate $\vec{T}$ from amongst the samples. One optimization that may be employed is to precompute $\check{C}(\vec{T})$ for all possible values of $\vec{T}$ so that the $\check{C}(\vec{T})$ values are readily available to compute the residual surfaces which are used to find the correct value of $\vec{T}$. The matrices $\check{C}(\vec{T})$ and $\check{C}(\vec{T})$ depend only on the locations of the five image points and on the choice of $\vec{T}$; they do not depend on the image velocity inputs. Therefore, the $\check{C}(\vec{T})$ matrix may be precomputed for a specified group of image points and for a specified choice of $\vec{T}$.

The right hand side of equation 12.0 is computed, once $\theta$ has been derived from the image sequence, for each of $\vec{T}_i$ in the samples by using the precomputed values of $\check{C}(\vec{T})$. The result is a residual surface that is a distributed representation of $\check{C}(\vec{T})$ over the two dimensional subspace of all possible directions of translation (i.e. all sampled $\vec{T}$). The minima in this residual surface represent the best choices for $\vec{T}$. Ideally, the minima are zero, but noise, as discussed below, often interferes in such calculation.

In accordance with one embodiment the residual, $R(T)$, is computed in two steps for all sets of five points in the image. First, a pair of weighted summations is calculated, given by $\theta^t \check{C}(\vec{T})$; and second, the sum of the square of the two resulting numbers is calculated. The minimum of the squares is then taken. These two steps result in a least squares estimate for $\vec{T}$. These computations can be done in parallel for each possible choice of $\vec{T}$ for each set of five points. The residual surfaces can be computed (also in parallel) for each different five-point group of image velocities distributed throughout each patch in the visual field; the resulting residual surfaces can then be summed for each patch to give a single estimate of $\vec{T}$ for that patch.

Alternative approaches may also be used. For instance, the residual surfaces throughout the entire image rather than merely for an individual patch may be summed. The resulting aggregate residual surface may have multiple minima. The lowest minima is selected, and the contribution of the optical flow vectors that are associated with the minima is removed from the residual surface. This minima represents the correct $\vec{T}$ for the corresponding optical flow vectors. Once these optical flow vectors are removed, the aggregate residual is recomputed and another minima is selected. This process is repeated until no minima remain.

Still further, estimating techniques other than the least squared approach may be used. Weighted least-squares, maximum likelihood and minimum mean-squared-error (Bayesian) techniques are all equally viable estimating techniques. In addition, sequential estimators such as the Kalman filter may be used that make use of the correct $\vec{T}$ value for a previous image frame along with new data to produce an updated estimate of the correct $\vec{T}$. The estimating technique of choice depends on the criteria that is most desirable.

Figure 3:
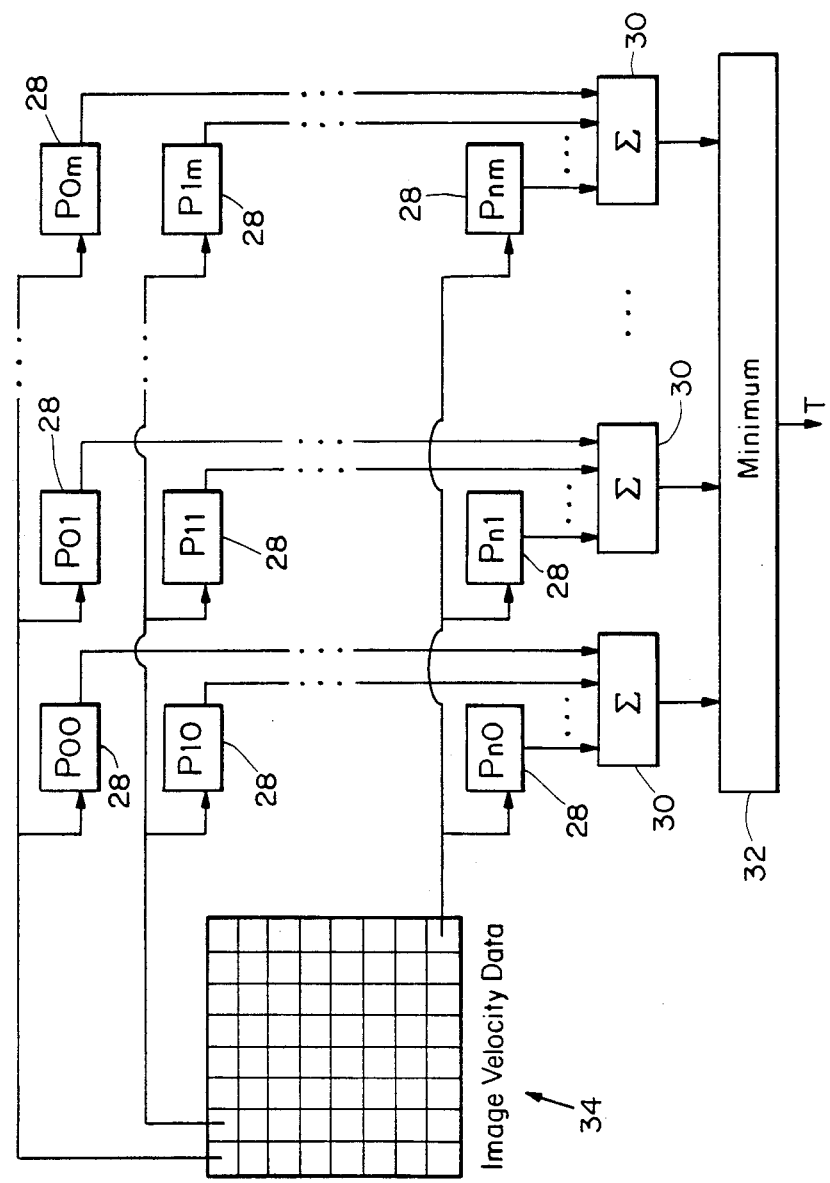
FIG. 3 shows a block diagram of the steps performed by the image processing system in finding $\vec{T}$.

FIG. 3 shows an image processing system that may be utilized to compute the direction of translation $\vec{T}$ for a given patch using the least-squares approach. In particular, image velocity data 34 for the patch is provided for each of a plurality of image regions numbered from 0 to n wherein each image region is comprised of a set of five selected points. Each image region contains input image velocities denoted by $\theta$. The possible values of $\vec{T}$ are numbered from 0 to m. Each processor 28 denoted as $P_{ij}$ computes the residual for the ith image region and the j choice of $\vec{T}$. As can be seen in FIG. 3 there is a separate processor 28 provided for each possible choice of $\vec{T}$ for each image region.

For each choice of $\vec{T}$, all of the residuals $R(\vec{T})$ are summed in boxes 30 for the entire stage to produce the sum residual surface described above. Because noise is likely to corrupt the image velocity data, it is necessary to use an estimating technique such as the least-squares estimate to choose the best estimate of $\vec{T}$. The minimum of the residual surface is determined by box 32, and this minimum constitutes the appropriate $\vec{T}$.

Figure 4:
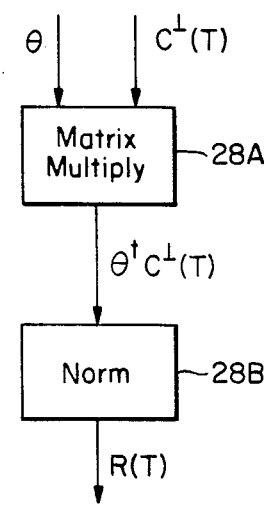
FIG. 4 shows a block diagram of the operations performed by the processing elements.

FIG. 4 gives a more detailed view of the function performed by the processors 28 shown in FIG. 3. In particular, the input image velocity $\theta$ is multiplied by the precomputed values of $\check{C}(\vec{T})$ in a matrix multiplication format as shown in box 28A. The resulting output is $\theta^t \check{C}(\vec{T})$. The magnitude or norm of $\theta^t \check{C}(\vec{T})$ gives the residual $R(\vec{T})$.

Figure 5:
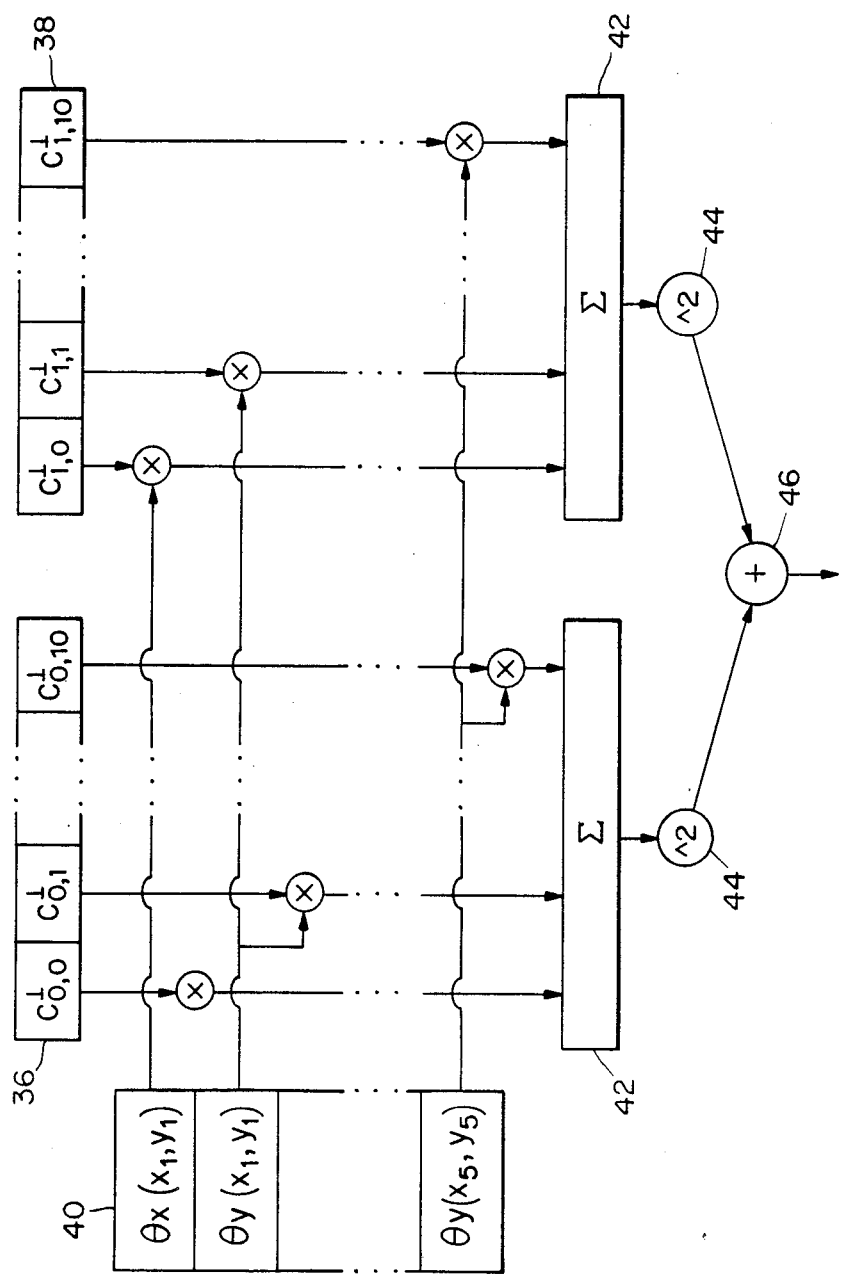
FIG. 5 illustrates a detailed view of the operations performed by the processing elements.

FIG. 5 depicts the operations shown in boxes 28A and 28B of FIG. 4 in more detail. The $\check{C}$ column vectors 36 and 38 are multiplied by each of the velocity components 40 of the selected five image points. The resulting products are summed by boxes 42 to complete the matrix multiplication of $\theta^t$ and $\check{C}(\vec{T})$. Once they are summed, each summation is squared 44 and added 46 to complete calculation of the residual $R(\vec{T})$.

Having determined an appropriate value of $\vec{T}$ for the patch, the system proceeds to find a value of $\vec{\Omega}$ for the patch in the least-squares embodiment. The first step the system follows in determining $\vec{\Omega}$ is to define a 10'5 matrix $A'(\vec{T})$ that is comprised of an orthonormal basis for $A'(\vec{T})$. Given that the columns are already orthogonal by construction, $A'(\vec{T})$ is obtained merely by normalizing $A'(\vec{T})$.

Once $A'(\vec{T})$ is defined, $B'(\vec{T})$ is defined in terms of $A'(\vec{T})$. In particular, $$B'(\vec{T}) = (I - A'(\vec{T}) [A'(\vec{T})]^t) B \qquad \text{(equation 13.0)}$$

where I is the identity matrix. $B'(\vec{T})$ is, thus, a $10 \times 3$ matrix that is, by construction, orthogonal to the $A(\vec{T})$ matrix. Accordingly, because of the orthogonality, $$[B'(\vec{T})]^t A(\vec{t}) = 0 \qquad \text{(equation 14.0)}$$

$B'(\vec{T})$ is useful in manipulating equation 5.0. Specifically, both sides of equation 5.0 can be multiplied by $[B'(\vec{T})]^t$ to yield $$B'(\vec{T})^t \theta = [B'(\vec{T})]^t p A(\vec{T}) + B\vec{\Omega}$$

since $[B'(\vec{T})]^t A(\vec{T}) = 0$ from equation 14.0, this can be written as:

$$B'(\vec{T})^t \theta = B\vec{\Omega} \qquad \text{(equation 15.0)}$$

This equation, in turn, may be written as:

$$b(\vec{T}\theta) = D(\vec{T})\vec{\Omega} \qquad \text{(equation 16.0)}$$

where $b(\vec{T},\theta)$ is a 3-vector that depends on input image velocities; and $D(\vec{T})\vec{\Omega}$ is a $3 \times 3$ matrix that depends only on $\vec{T}$ and the locations of the five selected image points.

Equation 16.0 represents a linear system of equations. This linear system of equations may be used to solve for $\vec{\Omega}$. The primary limitation of such an approach, however, is that $D(\vec{T})$ must be invertible. A more robust approach is to use a large number of flow vectors to yield a least-squares estimate of $\vec{\Omega}$. More specifically, for each set of five image points, there is an equation $$\vec{b}_i = D_i \vec{\Omega} \qquad \text{(equation 17.0)}$$

where i is an index of the set of five image points. Based on this equation (17.0), the least-squares solution for $\vec{\Omega}$ is obtained by minimizing:

$$\sum_i [D_i \vec{\Omega} - \vec{b}_i]^t [D_i \vec{\Omega} - \vec{b}_i] \qquad \text{(equation 18.0)}$$

The solution is $$\vec{\Omega} = \left[ \sum_i D_i^t D_i \right]^{-1} \left[ \sum_i D_i^t \vec{b}_i \right] \qquad \text{(equation 19.0)}$$

Figure 6:
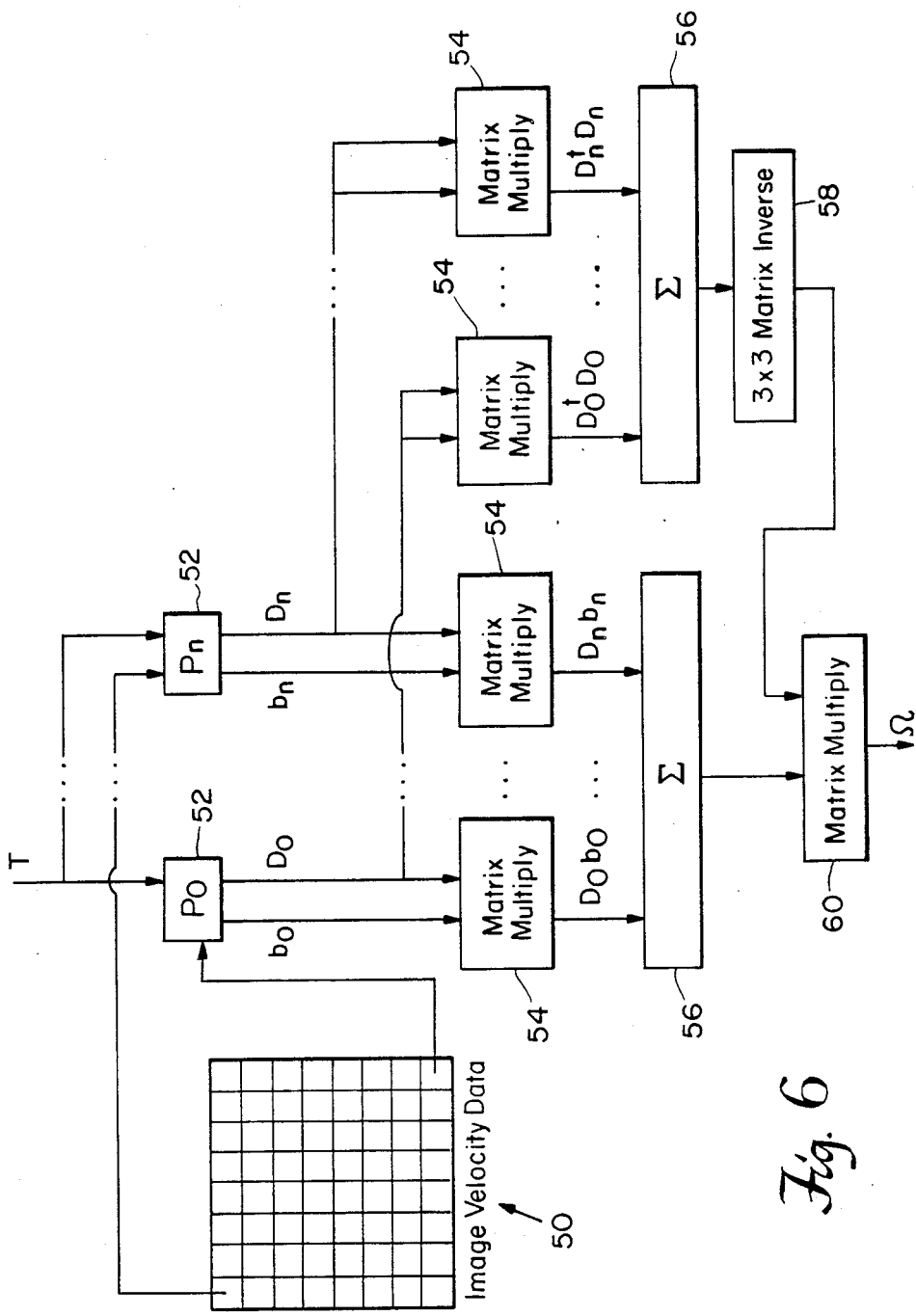
FIG. 6 shows a block diagram of the steps performed by the image processing system in finding $\vec{\Omega}$.

FIG. 6 shows a block diagram of a configuration of the image processing system that solves for $\vec{\Omega}$. As shown in FIG. 6, the image velocity data 50 for different sets of five selected points are numbered from 1 to n, and each set of five points has a corresponding image velocity $\theta$. The processors 52 use the $\theta$ and $\vec{T}$ (computed in the previous stage) to compute both $D_i$ and $\vec{b}_i$ for an image region. The matrices $D_i$ and $\vec{b}_i$ are then multiplied appropriately in boxes 54 and summed in boxes 56 in accordance with equation 19.0 to yield the summations shown in that equation. The appropriate summation $$\left( \text{i.e. } \sum_i D_i^t D_i \right)$$

is then inverted in box 58 and multiplied in box 60 by the other summation $$\left( \text{i.e. } \sum_i D_i^t \vec{b}_i \right)$$

to produce $\vec{\Omega}$.

Figure 7:
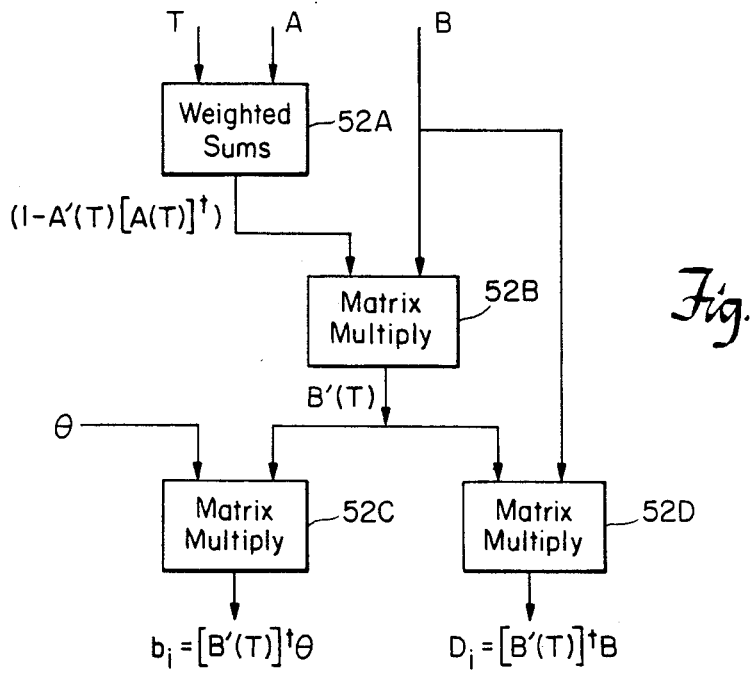
FIG. 7 depicts a block diagram of the operations performed by the processing elements.

FIG. 7 shows a more detailed view of the functions performed by the processing elements 54 denoted $P_i$. In particular, T and A are summed in a weighted manner in box 52A to produce $(I - A'(\vec{T}) [A(\vec{T})]^t)$ which is subsequently multiplied by B in box 52B to produce B'(T). B'(T) is then multiplied by $\Theta$ in box 52C to produce $\vec{b}_i$ and is also multiplied by B in box 52D to produce $D_i$.

Once $\vec{\Omega}$ is found, it is straightforward as how to recover p(x,y) because there are two linear equations for each image point which can be used to solve for p(x,y).

Figure 8:
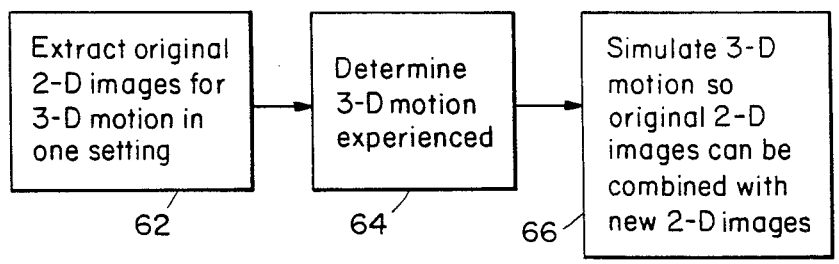
FIG. 8 shows a block diagram of application of the image processing system of the present invention to a film setting.

There are many applications for which the image processing system of the present invention may be employed. There are two that deserve mentioning. The first application concerning using the image processing system in a film environment. Suppose that a filmmaker wanted to film a special effects sequence such as a flying saucer flying through a heavily wooded forest. It would be impractical to attempt to build such a vehicle and maneuver it through the forest. The present invention allows such special effects nevertheless, to be created. The major steps used for such an application are shown in FIG. 8.

Specifically, a camera is attached to a vehicle in the first setting, the woods. The vehicle then passes through the woods with the camera rolling (block 62 in FIG. 8). The three dimensional motion experienced for the first setting is then extracted (block 64) from the film shot on the vehicle. This three dimensional motion information is then used in a second setting such as the studio. In the studio, a flying saucer is filmed moving on a platform. Since, the three dimensional motion of the first setting film is known, identical motion can be simulated (block 66) in the studio. In particular, the flying saucer could be moved about on the platform so that it experiences the same three dimensional motion as in the first setting. The film from both settings may then be combined so that it appears that the flying saucer and not a vehicle (such as a motorcycle) is flying through the forest. Both experience the same three dimensional motion, so there is no mismatch in images.

Figure 9:
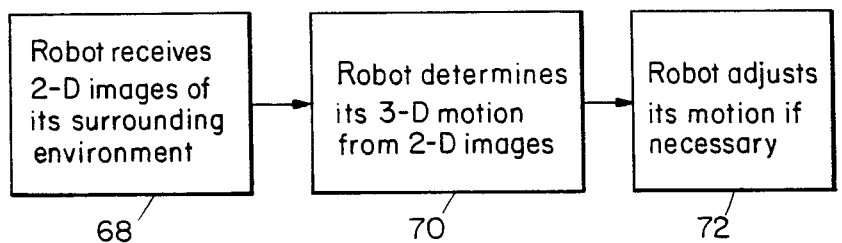
FIG. 9 shows a block diagram of application of the image processing system of the present invention to a robotic environment.

Another possible application concerns robots. It is desirable for robots that can move to know where they are oriented in their surrounding environment. This capability is provided by employing steps such as the shown in FIG. 9 using the image processing system of the present invention. To provide such a capability, the robot must be provided with an imager that views the three dimensional space surrounding the robot to generate two dimensional images (block 68). The two dimensional image data collected from the imager is processed by an image processing system such as described above. The processing produces three dimensional motion information (block 70). This three dimensional motion information is used by the robot to track where it currently is positioned in the surrounding three dimensional space. The position of the robot may be adjusted based on its tracked position (block 72).

More generally the present invention embodies an intelligent camera that has an imaging surface. The camera receives two dimensional images of three dimensional objects through the imaging surface. The camera processes the image data to recover three dimensional motion and depth information about the object. In particular, the camera can determine the translational velocity of the object, the rotational velocity of the object and the relative depth of the object. Moreover, it can record such recovered three dimensional information on display such information (e.g. relative depth maps). It can recover such information for each rigid object in its imaging field.

While the invention has been particularly shown and described with reference to preferred embodiments thereof, it will be understood by those skilled in the art that various changes in form and details may be made without departing from the spirit and scope of the invention as defined in the appended claims. For instance, alternate approaches to solving $\vec{\Omega}$ may be used. Further, the flow vectors need not be computed in a separate step; rather the operations required to obtain $\vec{T}$ may be integrated with calculating the flow vectors to constitute a single step. Still further, techniques other than a trial and error approach may be used. For instance, a gradient descent means may be used that does not require that all points in the solution space be plotted because it only examines selected values. Moreover, such search techniques need not seek a minimum, but rather, can be configured so that they search for a maximum that yields the appropriate $\vec{T}$. Likewise, an arbitrary number of image points rather than five may be selected.

We claim:

1. A method of determining a correct direction of three dimensional translational velocity of an object from a sequence over time of two object, comprising the steps of:
    (a) selecting a plurality of image points from the sequence of images;
    (b) performing a transformation on image intensities of the selected plurality of image points to yield transformation vectors; and
    (c) finding a correct direction of translational velocity such that the transformation vectors are in a range of a coefficient matrix, where the coefficient matrix is a set of column vectors that span a space of all possible transformation vectors corresponding to rigid objects with the correct direction of translational velocity and any arbitrary rotational velocity.

2. A method as recited in claim 1 wherein the selected image points are selected so that it is certain that the columns of the coefficient matrix are linearly independent.

3. A method as recited in claim 1 wherein the performing a transformation step comprises determing image velocity vectors at the selected points.

4. A method as recited in claim 1 wherein the step of finding a correct direction of translational velocity comprises trying various values for the direction of translational velocity to determine whether the transformation vectors are in a range of the coefficient matrix.

5. A method as recited in claim 1 wherein the finding of a correct direction of translational velocity comprises employing a search strategy to locate the correct direction of translation velocity.

6. A method as recited in claim 1 wherein the object is a three dimensional object.

7. A method as recited in claim 1 wherein the step of finding a correct direction of translational velocity further comprises finding a direction of translational velocity so that an orthogonal complement of the coefficient matrix is orthogonal to the transformation vectors.

8. A method as recited in claim 1 wherein positions of the selected image points and the direction of translational velocity determine the coefficient matrix.

9. A method as recited in claim 8 wherein different choices of the direction of translational velocity produce different coefficient matrices.

10. A method of determining a correct direction of three dimensional translational velocity $\vec{T}$ of an object from a sequence of two dimensional images taken over time that are projections of the object, comprising the steps of:
    (a) selecting a plurality of image points in each image of the sequence of two dimensional images that correspond to projections of points on the objects;
    (b) performing a transformation on image intensities of the selected plurality of image points to yield vectors $\theta$ which are velocities of the image points in two dimensions; and
    (c) finding a correct direction of $\vec{T}$ such that $\theta$ is in a range of $C(\vec{T})$, where $C(\vec{T})$ is a set of column vectors that span a space of all possible $\theta$ for rigid objects with translational velocity in the correct direction of $\vec{T}$ and any arbitrary rotational velocity.

11. A method as recited in claim 10 wherein the selected image points are selected so that it is certain that the columns of $C(\vec{T})$ are linearly independent.

12. A method as recited in claim 10 wherein the step of finding a correct direction of $\vec{T}$ comprises employing a trial and error technique of trying various directions of T to determine whether $\theta$ is in a range of $C(\vec{T})$.

13. A method as recited in claim 10 wherein the step of finding a correct direction of $\vec{T}$ comprises employing a search strategy that searches selected values in a solution space to locate a proper direction of $\vec{T}$.

14. A method of determining a correct direction of three dimensional translational velocity $\vec{T}$ of three dimensional object images taken from consecutive time frames wherein the images are projections of an object, comprising the steps of:
    (a) selecting a plurality of image points in each image of the sequence of two dimensional images that correspond to projections of points on the objects such that the image points selected for all the correspond to object points that share a same direction of three dimensional translational velocity $\vec{T}$;
    (b) calculating vectors $\theta$ that characterize two dimensional image velocity at the selected image points;
    (c) finding a correct direction of $\vec{T}$ such that $\theta$ is in a range of $C(\vec{T})$, where $C(\vec{T})$ is a set of column vectors that span a space of all possible $\theta$ for rigid objects with translational velocity in the correct direction of $\vec{T}$ and any arbitrary rotational velocity, and $C(\vec{T})$ is determined by positions of the selected image image points and by the correct direction of $\vec{T}$.

15. A method of determining a correct direction of three dimensional translational velocity $\vec{T}$ of an object from a sequence of two dimensional images over time that are projections of the object, comprising the steps:
    (a) selecting a plurality of image points from the sequence of images;
    (b) performing a transformation on image intensities of the selected plurality of image points to yield vectors $\theta$; and
    (c) defining $\tilde{C}(\vec{T})$ as a set of vectors that span the orthogonal complement of $C(\vec{T})$ where $C(\vec{T})$ is a set of column vectors that span a space of all possible $\theta$ for rigid objects with a translational velocity in the correct direction of $\vec{T}$ and any arbitrary rotational velocity; and
    (d) selecting a correct direction of $\vec{T}$ that provides a zero value for a norm of a product of $C(\vec{T})$ and $\theta$.

16. A method as recited in claim 15 wherein the step of selecting a correct direction of $\vec{T}$ comprises determining the product of $C(\vec{T})$ and $\theta$ for various directions of $\vec{T}$.

17. A method as recited in claim 15 wherein the step of selecting a direction of $\vec{T}$ comprises applying a systematic search strategy to locate a correct direction of T.

18. A method as recited in claim 15 further comprising precomputing all possible values of $\tilde{C}(\vec{T})$ for a discrete range of directions of $\vec{T}$ so that selection of a correct direction of $\vec{T}$ can be performed easily.

19. A method as recited in claim 15 wherein the selected image points are selected so it is assured that the columns of $C(\vec{T})$ are linearly independent.

20. A method as recited in claim 15 wherein the step of performing a transformation comprises determining image velocity vectors of the selected image points.

21. A method as recited in claim 15 where $C(\vec{T})$ depends on positions of the selected image points and on $\vec{T}$.

22. A method of determining three dimensional motion and depth of an object from a sequence of two dimensional images over time that are projections of the object, comprising the steps of:
(a) selecting a plurality of image points from the sequence of images;
(b) performing a transformation on image intensities of the selected plurality of image points to yield vectors $\theta$;
(c) finding a unit vector of translation velocity of the three dimensional motion denoted as $\vec{T}$ such that $\theta$ is in a range of $C(\vec{T})$ where $C(\vec{T})$ is a set of column vectors that span a space of all possible $\theta$ for rigid objects with translational velocity in a direction of $\vec{T}$ and any arbitrary rotational velocity; and
(d) determining rotational velocity of the three dimensional motion and three dimensional depth in light of the determined value of $\vec{T}$.

23. An image processing system comprising:
(a) an imager for receiving two dimensional projections of three dimensional motion and depth of an object;
(b) a processing means for processing a series of images of the object to determine actual corresponding three dimensional motion and depth of points on the object from image data provided by the imager.

24. An image processing system as recited in claim 23 wherein the imager is a video camera.

25. An image processing system as recited in claim 23 wherein the processing means determines rotational velocity, relative depth and direction of translational velocity for the points on the object.

26. An image processing system as recited in claim 23 wherein the imager is an array of imaging elements.

27. An image processing system as recited in claim 26 wherein the imager is comprised of an array of charge coupled devices.

28. An image processing system as recited in claim 23 wherein the processing means comprises a plurality of processing elements.

29. An image processing system as recited in claim 28 wherein the plurality of processing elements process in parallel.

30. An image processing system as recited in claim 29 wherein each processing element acts on a selected region of the images.

31. A method of combining film sequences using an image processing system, comprising the steps of:
(a) filming three dimensional motion in a first setting;
(b) extracting the three dimensional motion from the two dimensional images; and
(c) repeating the three dimensional motion when filming in a second setting so that film from the first setting may be readily combined with film from the first setting.

32. An image processing system comprising:
(a) a camera means for filming in a first setting and a second setting; and
(b) a processing means for extracting three dimensional motion experienced in the first setting from the film in the first setting so that such motion can be repeated when filming in the second setting to allow film from both settings to be readily combined.

33. A robotic system comprising;
(a) a robot that is capable of motion in a three dimensional space, wherein the robot has an imager for viewing the three dimensional space as the robot moves;
(b) an image processing system coupled to the robot for extracting three dimensional motion information for the robot from two dimensional images from the imager so that the robot can track its motion in the three dimensional space.

34. An intelligent camera that records two dimensional images of three dimensional objects and is able to process the two dimensional images to determine the corresponding translational velocity and rotational velocity of the objects as well as to determine relative depth maps of the objects, comprising:
(a) a visual receiver for receiving the two dimensional images;
(b) a recorder for recording the two dimensional images of objects received by the visual receiver; and
(c) a processor programmed to process the two dimensional images recorded by the recorder to determine the corresponding translational velocity and rotational velocity of the objects as well as to determine the relative depth maps of the objects.

35. An intelligent camera as recited in claim 34 wherein the camera determines and records three dimensional motion information for each of the objects moving rigidly with respect to the camera.

36. An intelligent camera as recited in claim 34 wherein the camera determines and records separate relative depth maps for each object moving rigidly with respect to the camera.

37. A method of tracking three dimensional motion over time for an object using an image processing system, comprising the steps of:
(a) taking a first sequence of two dimensional images of the object;
(b) processing the first sequence of images so as to be able to extract the translational and rotational velocity of the object for the sequence;
(c) taking a second sequence of two dimensional images of the object at a subsequent time;
(d) updating the translational and rotational velocity of the object by processing the second sequence of images in view of the previous translational and rotational velocity.

38. A method as recited in claim 37 wherein the step of updating comprises employing standard sequential estimation techniques.

39. A method as recited in claim 38 wherein the standard sequential estimation technique employed is a Kalman filter.

* * * * *

UNITED STATES PATENT AND TRADEMARK OFFICE
CERTIFICATE OF CORRECTION

PATENT NO.    :  4,980,762
DATED         :  December 25, 1990
INVENTOR(S)   :  David J. Heeger and Allan Jepson It is certified that error appears in the above-identified patent and that said Letters Patent is hereby corrected as shown below:

Claim 1, Column 13, line 3, insert --dimensional images that are projections of the-- after the word "two".

Claim 14, Column 14, line 17, delete "image" and insert --images-- after the words "all the".

Claim 17, Column 14, line 55, change "T" to --$\vec{T}$--.

Signed and Sealed this

Thirtieth Day of June, 1992

*Attest:*

DOUGLAS B. COMER

*Attesting Officer*          *Acting Commissioner of Patents and Trademarks*